US012670758B2

(12) United States Patent
Jung et al.

(10) Patent No.: US 12,670,758 B2
(45) Date of Patent: Jun. 30, 2026

(54) AUTHENTICATION DEVICE AND VEHICLE HAVING THE SAME

(71) Applicants: Hyundai Motor Company, Seoul (KR); Kia Corporation, Seoul (KR)

(72) Inventors: Jaewon Jung, Hwaseong-si (KR); Youlan Lim, Seoul (KR); Juyeong Lee, Ansan-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 336 days.

(21) Appl. No.: 18/081,252

(22) Filed: Dec. 14, 2022

(65) Prior Publication Data

US 2024/0013600 A1 Jan. 11, 2024

(30) Foreign Application Priority Data

Jul. 6, 2022 (KR) .......................... 1020220082874

(51) Int. Cl.
*G07C 9/25* (2020.01)
*G06V 40/16* (2022.01)

(52) U.S. Cl.
CPC .......... *G07C 9/253* (2020.01); *G06V 40/161* (2022.01)

(58) Field of Classification Search
CPC ................ G07C 9/253; G07C 9/00817; G07C 9/00563; G07C 9/00309; G07C 9/00571; G07C 9/00896; G06V 40/161; G06V 20/593; G06V 40/172; G06V 40/16;

B60R 25/01; B60R 25/25; B60R 25/305; B60R 1/26; B60J 1/17; E05F 15/71; E05F 15/73; G01W 1/14
See application file for complete search history.

(56) References Cited

U.S. PATENT DOCUMENTS

| | | | | |
|---|---|---|---|---|
| 6,330,501 | B1 * | 12/2001 | Breed | B60N 2/0028 701/45 |
| 7,602,947 | B1 * | 10/2009 | Lemelson | B60R 25/252 382/116 |
| 8,406,519 | B1 * | 3/2013 | Lim | G06T 11/00 382/170 |
| 10,380,414 | B2 * | 8/2019 | Yao | G06V 40/176 |
| 10,479,319 | B1 * | 11/2019 | Wengreen | B60R 25/01 |
| 10,850,709 | B1 * | 12/2020 | Nagata | B60R 25/241 |
| 11,358,459 | B1 * | 6/2022 | Miller | B60J 1/2047 |
| 11,383,676 | B2 * | 7/2022 | Huang | E05B 77/44 |

(Continued)

*Primary Examiner* — Solomon G Bezuayehu
(74) *Attorney, Agent, or Firm* — Fish & Richardson P.C.

(57) ABSTRACT

A vehicle includes an authentication camera provided on an exterior of a body of the vehicle, a vehicle terminal provided on an interior of the body and receiving a user input, an auxiliary display provided on the interior of the body and displaying a review view image, and a processor controlling, upon receipt of a face registration start command for a user, the vehicle terminal to display guide information for a face registration procedure, controlling the auxiliary display to display a guideline and image information acquired by the authentication camera, acquiring outline information of a face image based on the acquired image information, recognizing face information based on the acquired outline information of the face image and location information of the guideline, and registering the recognized face information as the face information of the user.

20 Claims, 9 Drawing Sheets

1

(56) References Cited

U.S. PATENT DOCUMENTS

| | | | | |
|---|---|---|---|---|
| 11,495,074 | B2 * | 11/2022 | Park | B60R 25/25 |
| 12,157,491 | B2 * | 12/2024 | Meier-Arendt | G08G 1/168 |
| 2009/0304239 | A1 * | 12/2009 | Itou | H04N 1/448 |
| | | | | 382/118 |
| 2010/0032993 | A1 * | 2/2010 | Yoshida | B60J 7/0573 |
| | | | | 296/223 |
| 2012/0126939 | A1 * | 5/2012 | Chang | G07C 9/00563 |
| | | | | 340/5.53 |
| 2012/0154136 | A1 * | 6/2012 | Connelly, Jr. | B60Q 9/00 |
| | | | | 340/457 |
| 2012/0320181 | A1 * | 12/2012 | Hong | H04N 1/00307 |
| | | | | 348/78 |
| 2013/0204457 | A1 * | 8/2013 | King | B60K 28/06 |
| | | | | 701/1 |
| 2015/0043790 | A1 * | 2/2015 | Ono | G06V 40/172 |
| | | | | 382/118 |
| 2015/0055086 | A1 * | 2/2015 | Fonte | G02C 7/024 |
| | | | | 700/98 |
| 2016/0261793 | A1 * | 9/2016 | Sivan | H04N 19/597 |
| 2016/0364561 | A1 * | 12/2016 | Lee | G06F 21/32 |
| 2018/0060648 | A1 * | 3/2018 | Yoo | G06V 40/40 |
| 2018/0276454 | A1 * | 9/2018 | Han | G06V 40/172 |
| 2018/0285630 | A1 * | 10/2018 | Han | G06V 40/172 |
| 2019/0106926 | A1 * | 4/2019 | Seki | E05F 15/71 |
| 2019/0340423 | A1 * | 11/2019 | Kim | G06V 40/165 |
| 2020/0238952 | A1 * | 7/2020 | Lindsay | G06V 30/194 |
| 2020/0247214 | A1 * | 8/2020 | Takata | B60H 1/00771 |
| 2021/0009080 | A1 * | 1/2021 | Hu | G06V 10/82 |
| 2021/0183194 | A1 * | 6/2021 | Park | G07C 9/00563 |
| 2021/0248389 | A1 * | 8/2021 | Liu | H04N 7/188 |
| 2021/0291790 | A1 * | 9/2021 | Morosawa | G06V 40/173 |
| 2021/0309181 | A1 * | 10/2021 | Kale | B60R 25/25 |
| 2021/0331706 | A1 * | 10/2021 | Kim | B60K 35/80 |
| 2022/0012323 | A1 * | 1/2022 | Moriwaki | H04L 63/083 |
| 2022/0027649 | A1 * | 1/2022 | Lee | G06V 40/168 |
| 2022/0030178 | A1 * | 1/2022 | Nagata | H04N 5/2628 |
| 2022/0058378 | A1 * | 2/2022 | Ann | G06F 3/167 |
| 2022/0194228 | A1 * | 6/2022 | Salter | A01K 29/005 |
| 2022/0219515 | A1 * | 7/2022 | Lee | B60J 1/2086 |
| 2022/0306003 | A1 * | 9/2022 | Morosawa | G06V 40/103 |
| 2023/0036233 | A1 * | 2/2023 | Shimizu | B60K 35/10 |
| 2023/0334927 | A1 * | 10/2023 | Mori | G07C 9/00563 |
| 2024/0126853 | A1 * | 4/2024 | Miura | G06F 21/32 |
| 2024/0201790 | A1 * | 6/2024 | Kawamura | G06F 3/017 |
| 2024/0273951 | A1 * | 8/2024 | Kajiyama | B60K 35/10 |

* cited by examiner

AUTHENTICATION DEVICE AND VEHICLE HAVING THE SAME

CROSS-REFERENCE TO RELATED APPLICATION(S)

This application claims the benefit of priority to Korean Patent Application No. 10-2022-0082874, filed on Jul. 6, 2022 in the Korean Intellectual Property Office, the disclosure of which is incorporated herein by reference.

TECHNICAL FIELD

The present disclosure relates to an authentication device for authenticating a registered user and a vehicle having the same.

BACKGROUND

A vehicle can be locked or unlocked and started on or off by using a key or a remote controller. For example, by carrying the remote controller, the driver can open and close the doors and trunk of the vehicle as well as start the engine of the vehicle.

The remote controller performs two-way communication with the vehicle so as to unlock the doors of the vehicle automatically when the driver is close to the vehicle without a separate manual operation, thereby allowing the driver to open a door or trunk and to start the vehicle by the start button.

For a conventional vehicle, however, if the driver left the remote controller inside the vehicle, this exposes items inside the vehicle and even the vehicle itself to the risk of theft by others.

Accordingly, recent technologies are pursuing to allow the vehicle to be controlled (door opening and closing and starting control, etc.) after performing user authentication while communicating with the remote controller.

Such user authentication involves registering user information and requires technologies for easily registering user information for all age groups and all levels of society.

SUMMARY

An aspect provides an authentication device for displaying a guideline and a face image acquired by an authentication camera in response to receipt of a face registration start command for the face of a user, and a vehicle having the same.

Another aspect provides an authentication device that adjusts, in response to whether it rains, the opening degree of the window glass when registering a user's face and displays a guideline and a face image acquired by an authentication camera through at least one of a plurality of displays, and a vehicle having the same.

An authentication device according to an aspect includes a communication module communicating with an authentication camera and a vehicle terminal, a face recognition processor controlling, upon receipt of a face registration start command for a user via the vehicle terminal, the vehicle terminal to display guide information for a face registration procedure and a guideline, acquiring outline information of a face image based on image information acquired via the authentication camera, recognizing face information based on the acquired outline information of the face image and location information of the guideline, and registering the recognized face information as the face information of the user, and an authentication processor performing user authentication based on the face information recognized by the face recognition processor and a preregistered face information of the user.

The face recognition processor of the authentication device according to an aspect determines whether the guideline and the outline of the face match based on the location information of the guideline and the outline information of the face image and registers, in response to the guideline and the outline of the face matching, the recognized face information as the face information of the user.

The authentication device according to an aspect further includes a body processor controlling opening and closing of a door and opening and closing a window glass provided in the door. The face recognition processor of the authentication device according to an aspect determines whether the user is in a boarding state or an alighting state based on opening-closing control information of the door from the body processor and controls, in response to the user being in the boarding state, the vehicle terminal to output the guide information for the face registration procedure.

The face recognition processor of the authentication device according to an aspect determines, in response to the user being in the alighting state, whether a predetermined time elapses from a time point when the user gets off and transmits, upon the predetermined time elapsing, an opening command of the window glass to the body processor.

The authentication device according to an aspect further includes a body processor controlling opening and closing of a door and opening and closing a window glass provided in the door. The communication module of the authentication device according to an aspect communicates with a rain sensor sensing presence or absence of rain. The face recognition processor of the authentication device according to an aspect determines whether weather is rainy based on sensing information of the rain sensor, transmits, in response to the weather being not rainy, an opening command of a first opening degree of a window glass to the body processor, and transmits, in response to the weather being rainy, an opening command of a second opening degree of the window glass to the body processor. The first opening degree is greater than the second opening degree.

The face recognition processor of the authentication device according to an aspect determines whether the user is in an alighting state based on opening-closing control information of the door from the body processor, determines, in response to the user being in the alighting state, whether a predetermined time elapses from a time point when the user gets off, and transmits, upon the predetermined time elapsing, the opening command of the first opening degree of the window glass or the opening command of the second opening degree of the window glass to the body processor.

The face recognition processor of the authentication device according to an aspect identifies, in response to the weather being rainy, height information of the user, identifies the second opening degree corresponding to the identified height information of the user, and transmits the opening command corresponding to the identified second opening degree to the body processor.

The face recognition processor of the authentication device according to an aspect requests, upon receipt of a face registration start command for the user, the input of height of the user and stores, upon receipt of height information of the user from the vehicle terminal, the received height information of the user.

US 12,670,758 B2

3

The second opening degree of the authentication device according to an aspect is an opening degree corresponding to average adult height information.

An authentication device according to another aspect includes a communication module communicating with an authentication camera, a vehicle terminal, and an auxiliary display; a face recognition processor controlling, upon receipt of a face registration start command for a user through the vehicle terminal, the auxiliary display to display a guideline and image information acquired by the authentication camera, acquiring outline information of a face image based on the acquired image information, recognizing face information based on the acquired outline information of the face image and location information of the guideline, and registering the recognized face information as face information of the user; and an authentication processor performing user authentication based on the face information recognized by the face recognition processor and pre-registered face information of the user.

The authentication device according to another aspect includes a body processor controlling the opening and closing of a door and opening and closing of a window glass provided in the door. The face recognition processor of the authentication device according to another aspect determines whether the user is in a boarding state or an alighting state based on opening-closing control information of the door from the body processor, controls, in response to the user being in the boarding state, the vehicle terminal to output guide information for a face registration procedure, determines, in response to the user being in the alighting state, whether a predetermined time elapses from a time point when the user gets off, and transmits, upon the predetermined time elapsing, an opening command of the window glass to the body processor.

The communication module of the authentication device according to another aspect communicates with a rain sensor sensing the presence or absence of rain. The face recognition processor of the authentication device according to another aspect determines whether weather is rainy based on sensing information from the rain sensor, transmits, in response to the weather being not rainy, an opening command of a first opening degree of the window glass to the body processor, and transmits, in response to the weather being rainy, an opening command of a second opening degree of the window glass to the body processor.

The second opening degree of the authentication device according to another aspect is less than the first opening degree and corresponds height information of the user.

The face recognition processor of the authentication device according to another aspect determines whether the guideline and an outline of a face match based on the location information of the guideline and the outline information of the face image and registers, in response to the guideline and the outline of the face matching, the recognized face information as the face information of the user.

A vehicle according to still another aspect includes an authentication camera provided on an exterior of a body of the vehicle and acquiring image information, a vehicle terminal provided on an interior of the body and receiving a user input and displaying various information; an auxiliary display provided on the interior of the body and displaying an review view image; and a processor controlling, upon receipt of a face registration start command for a user via the vehicle terminal, the vehicle terminal to display guide information for a face registration procedure, controlling the auxiliary display to display a guideline and image information acquired by the authentication camera, acquiring outline information of a face image based on the acquired image information, recognizing face information based on the acquired outline information of the face image and location information of the guideline, and registering the recognized face information as the face information of the user.

The vehicle according to still another aspect further includes a plurality of doors, a window glass provided in each of the doors, and an opening-closing member opening and closing the window glass. The processor of the vehicle according to still another aspect determines whether the user is in a boarding state or an alighting state based on opening-closing information of the door, determines, in response to the user being in the alighting state, whether a predetermined time elapses from a time point when the user gets off, and controls, upon the predetermined time elapsing, the opening-closing member to open the window glass.

The authentication camera of the vehicle according to still another aspect is provided on a B pillar of the body. The window glass of the vehicle according to still another aspect is a window glass provided on a driver's seat side door among the plurality of doors.

The vehicle according to still another aspect further includes a rain sensor sensing presence or absence of rain. The processor of the vehicle according to still another aspect determines whether weather is rainy based on sensing information from the rain sensor, controls, in response to the weather being not rainy, the window glass to be open at a first opening degree, and controls, in response to the weather being rainy, the window glass to be open at a second opening degree. The second opening degree of the vehicle according to still another aspect is less than the first opening degree and corresponds to height information of the user.

The auxiliary display of the vehicle according to still another aspect includes at least one of a side mirror monitor provided on an interior of a passenger's seat side door and a display provided in a rearview mirror and displaying center rearview image information acquired by a rear camera.

The processor of the vehicle according to still another aspect determines whether the guideline and an outline of a face match based on the location information of the guideline and the outline information of the face image and registers, in response to the guideline and the outline of the face matching, the recognized face information as the face information of the user.

DETAILED DESCRIPTION

Figure 1:
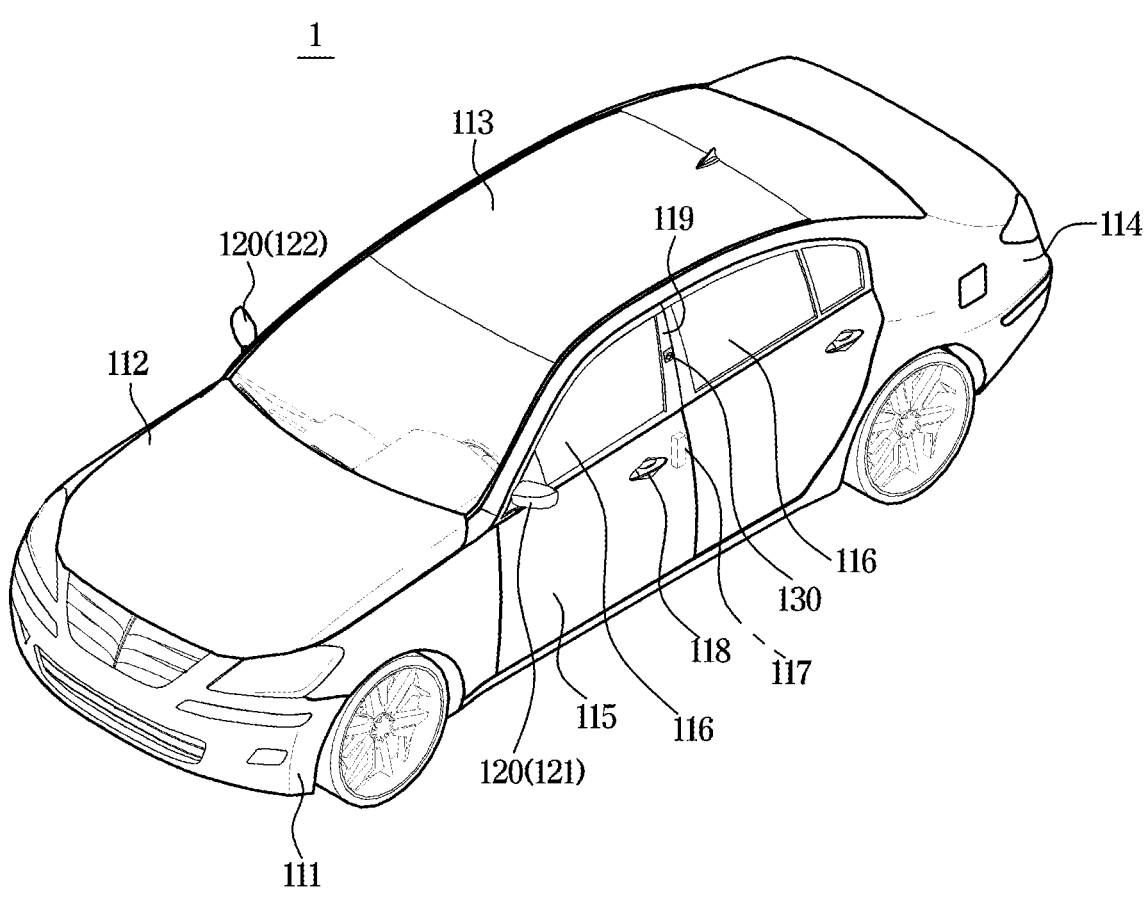
FIG. 1 is an exemplary diagram of an exterior of a vehicle.
Figure 2:
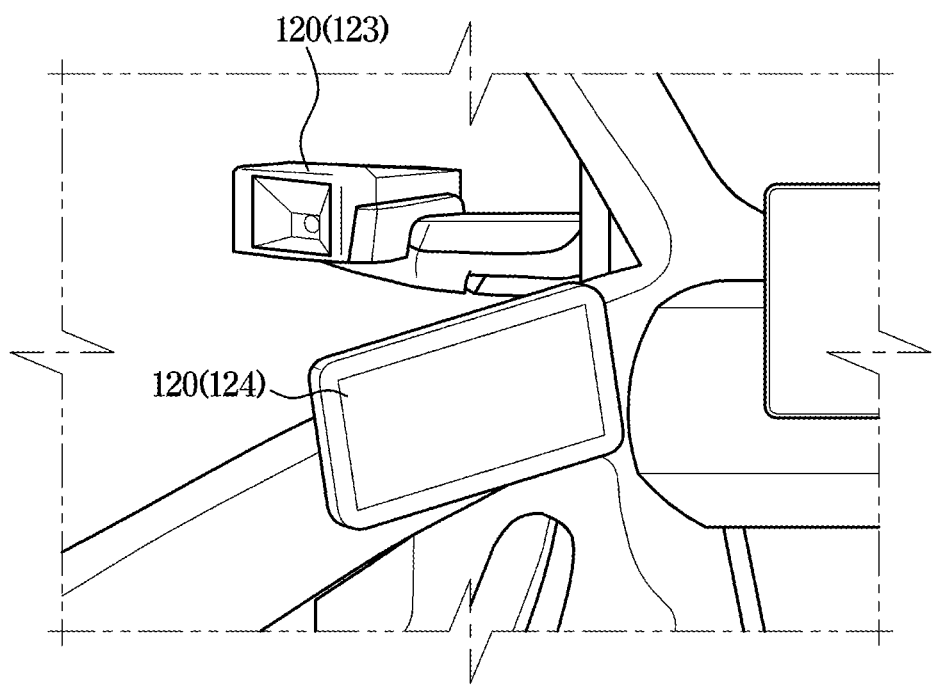
FIG. 2 is an exemplary diagram of a digital side mirror provided in a vehicle.
Figure 3:
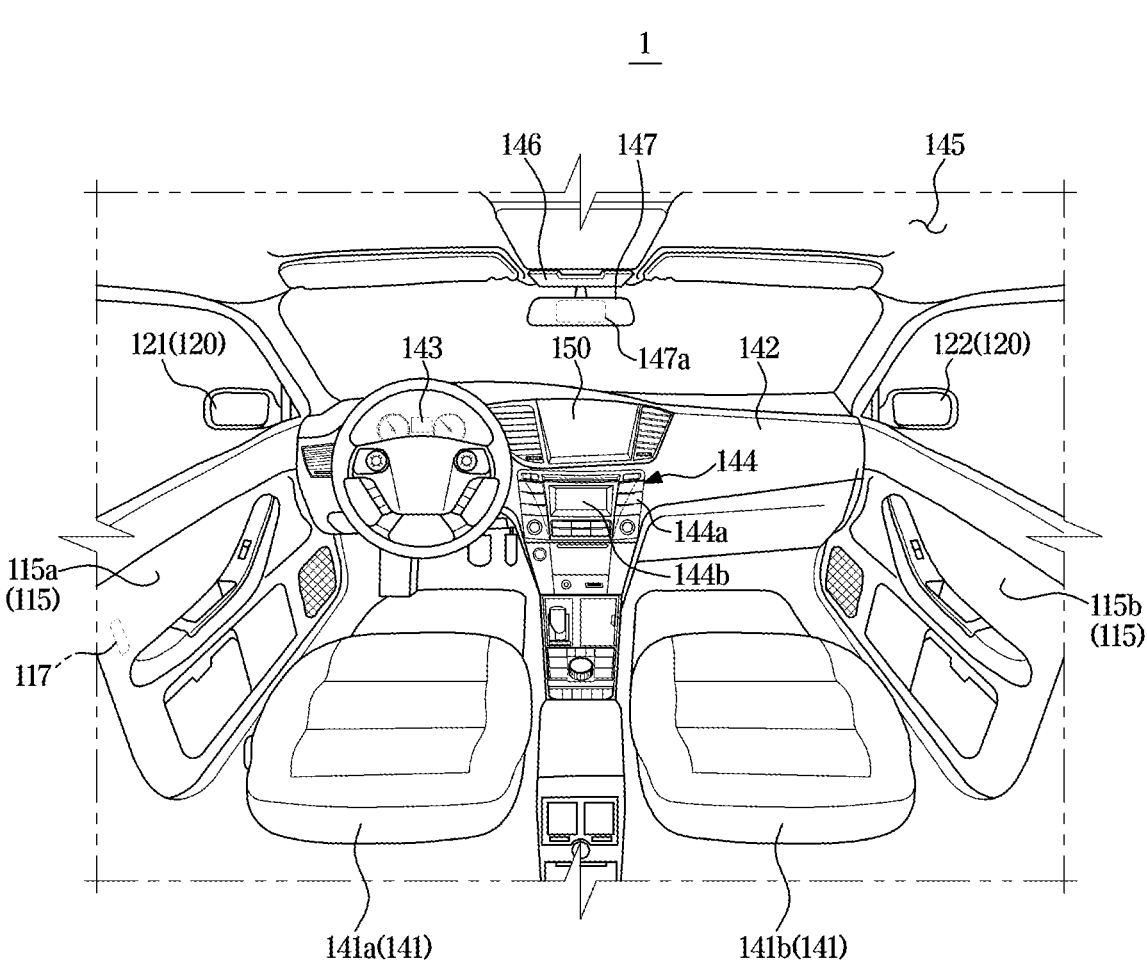
FIG. 3 is an exemplary diagram of an interior of a vehicle.

FIG. 1 is an exemplary diagram of an exterior of a vehicle, FIG. 2 is an exemplary diagram of a digital side mirror provided in a vehicle, and FIG. 3 is an exemplary diagram of an interior of a vehicle.

The vehicle 1 includes a body having an interior and an exterior and a chassis in which mechanical devices necessary for driving are installed as the remaining parts except for the body.

The body of the vehicle includes a front panel 111, a bonnet 112, a roof panel 113, a rear panel 114, front left and right doors 115 (115*a* and 115*b*) and rear left and right doors, window glass 116 provided in the front left and right doors and rear left and right doors in an openable/closeable manner, a front windshield glass for securing a front view and a rear windshield glass for securing a rear view.

The door 115 may be provided with a coupling member allowing the door to be coupled or separated from the body and a locking member 117 locking and unlocking the door 115.

The locking member 117 and the coupling member can be implemented with an actuator, which may vary in type.

Each door 115 may be provided with an opening-closing member 116*a* (refer to FIG. 4) for opening and closing the window glass 116 by moving the window glass 116 of each door 115 up and down.

The door 115 is provided with a handle 118 that a user can hold by hand.

The handle 118 is provided with an operation member 118*a* (refer to FIG. 4) for receiving a user's open/close command. The operation member 118*a* may be provided in various types, such as a switch type, a button type, a touch type, and a lever type.

The locking member 117 and the coupling member may be operated by manipulation of the handle 118.

The vehicle may include A pillars provided along the sides of the front windshield glass on the boundaries with the doors of the front seats, B pillars 119 provided on the boundary between the doors of the front seats and the doors of the rear seats, and C pillars provided along the sides of the rear windshield glass on the boundaries with the doors of the rear seats.

The vehicle may further include a side mirror 120 for providing the driver with a view of the rear of the vehicle 1 and a mirror adjusting member for folding or unfolding the side mirror 120.

There may be a plurality of side mirrors 120.

The first side mirror 121 may be provided on the driver's seat side door 115*a* to secure a left rear view, and the second side mirror 122 may be provided on the passenger's seat side door 115*b* to secure a right rear view.

The side mirror 120 may be implemented in a digital manner (referred to as a Digital Side Mirror).

The digital side mirror 120 may be provided on the drivers seat side door and the passenger seat side door.

As shown in FIG. 2, each digital side mirror 120 may include a camera 123 and a monitor 124.

For example, the digital side mirror 120 provided on the driver's side may include a side camera 123 provided on the outside of the driver's seat side door 115*a* to acquire a rear left view image and a monitor 124 provided on the inside of the driver's seat side door to display the image acquired by the side camera 123 provided on the outside of the drivers seat side door.

The digital side mirror 120 provided on the passenger's side may include a side camera 123 provided on the outside of the passengers seat side door 115*b* to acquire a right rear view image and a monitor 124 provided on the inside of the passengers seat side door 115*b* to display the image acquired by the side camera 123 provided on the outside of the passengers seat side door.

The digital side mirror 120 may acquire a clear and wide-angle rear view and may secure an appropriate rear view even under adverse environmental conditions, such as at night or in rain.

The side camera 123 may support full high definition (FHD) for image processing, and the monitor 124 may be an organic light emitting diode (OLED) monitor and may further include an image sensor and a system on chip (SOC) that controls converting analog signals of images to digital signals and processes the signals, and performs image processing.

The monitor of the digital side mirror provided on the passengers seat side may be set in a direction that can be viewed almost frontward from the driver's position so as to be advantageous to secure a right rear view.

An authentication camera 130 for acquiring an image for user authentication may be further provided on the body of the vehicle.

The authentication camera 130 may be provided on a B pillar 119 of the drivers seat side door 115*a*.

The authentication camera 130 may include a charge-coupled device (CCD) or complementary metal-oxide-semiconductor (CMOS) image sensor and may include a 3-dimensional (3D) spatial recognition sensor such as a KINECT sensor (RGB-D sensor), a time-of-flight (TOF) sensor, a stereo camera sensor, etc.

The authentication camera 130 may include a camera of a peripheral monitoring device (surround view monitor (SVM) or around view monitor (AVM)) and may include a camera of a blind spot detection device (BSD) or a camera of a rear detection device. The authentication camera 130 may be a wide-angle camera.

As shown in FIG. 3, the interior of the body may include a seat 141 (141*a* and 141*b*) on which the occupant sits, a dashboard 142, a cluster (i.e., instrument panel) placed on the dashboard 142 to display driving functions and vehicle information such as driving speed, engine rotation speed, oil amount, and coolant, a head unit provided adjacent to the dashboard 142 to control an audio device, an air conditioner, a Bluetooth device, and seat heating element, a head lining 145 provided on the upper side of the door 115 and forming a ceiling interior, an overhead console 146 provided on the head lining 145, and a rearview mirror 147 provided on the head lining 145 to secure a review.

The head unit 144 may be provided with a first input unit 144*a* for receiving an operation command and operation information of at least one electronic device and a first display 144*b* for displaying operation information of various functions performed in the vehicle and information corresponding to a user input.

The first input unit 144*a* receives a user input. For example, the first input unit 144*a* may receive a user command for an audio device and an air conditioner, a trunk opening/closing command, a trunk locking command, and a trunk unlocking command, a window glass opening command, a window glass closing command, an door opening/closing command for at least one door, a door locking command for at least one door, a door unlocking command for at least one door, and operation command and operation information for the vehicle terminal.

The first input unit 144*a* may be provided on at least one of a steering wheel, a head unit, and a center fascia to receive an on-off command of at least one of a plurality of functions, an operation command for at least one of the functions, and information on a setting value for changing an operation state of various functions.

The first input unit 144a may be provided in at least one of a jog dial type, a button type, and a touch pad type.

The rearview mirror 147 may include a rear display 147a for displaying an image acquired by a rear camera provided in the vehicle.

The vehicle may further include a vehicle terminal 150 provided on the dashboard 142 in a buried or stationary manner.

The terminal 150 is also called a connected car integrated cockpit (ccIC) or audio-video-navigation (AVN) device.

The terminal 150 displays an image of at least one function selected by the user among an audio function, a video function, a navigation function, a broadcasting function (DMB function), a radio function, a content playback function, an Internet search function, and an autonomous driving information display function.

The terminal 150 may also display an image for the rear view acquired from the rear camera.

The terminal 150 may receive a face registration start command and a face registration end command for the user's face registration and display guide information for face registration and a guideline for face registration.

The terminal 150 may be provided as a touch screen in which the display panel and the touch panel are integrated.

The chassis of the vehicle is a frame supporting the body of the vehicle and may include a power device, a braking device, and a steering device for applying a driving force, a braking force, and a steering force to the front left and right and rear left and right wheels, and further include a suspension device, a transmission device, and the like.

Figure 4:
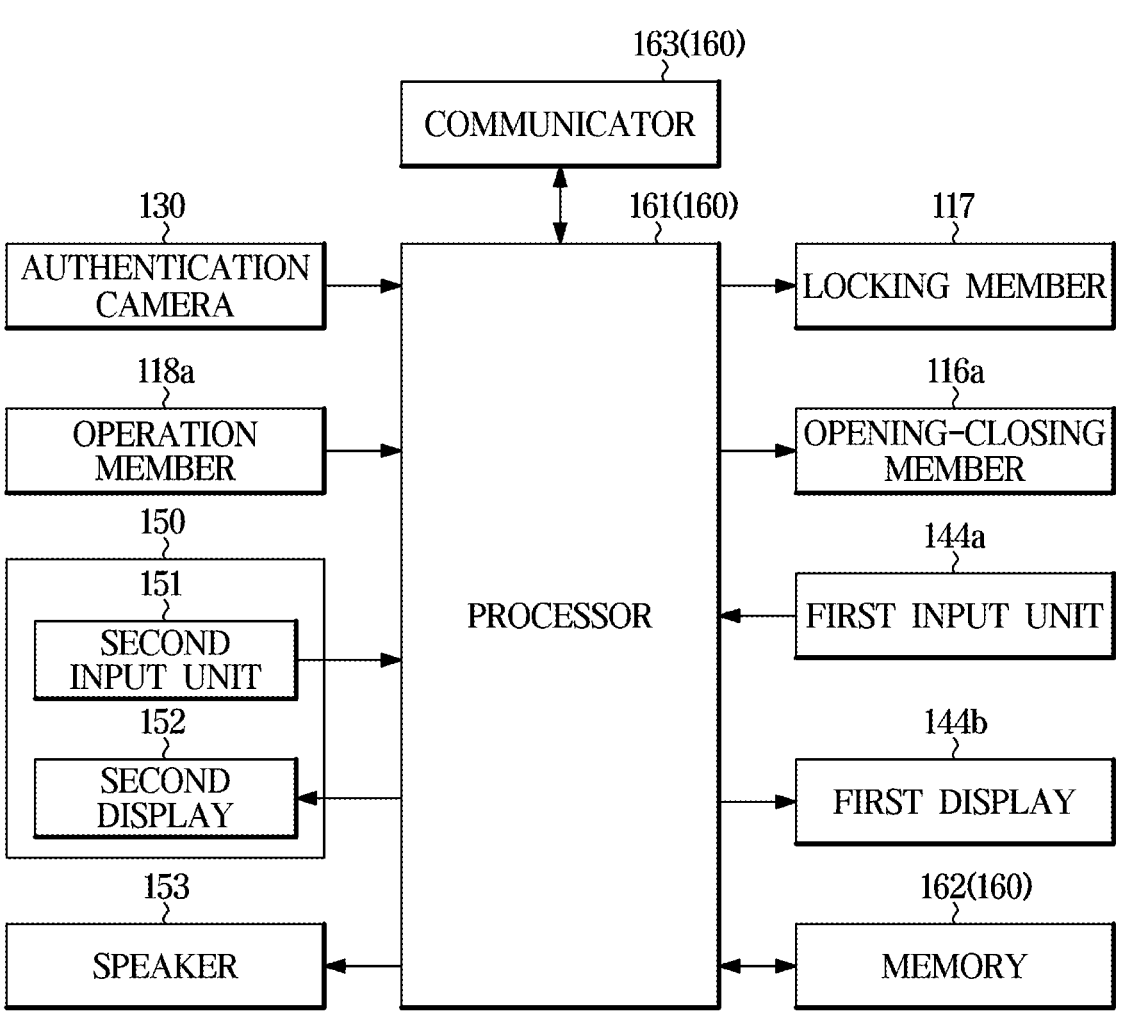
FIG. 4 is a control block diagram of an example of a vehicle.

FIG. 4 is a control block diagram of a vehicle, which will be described with reference to FIGS. 5 to 7.

Figure 5:
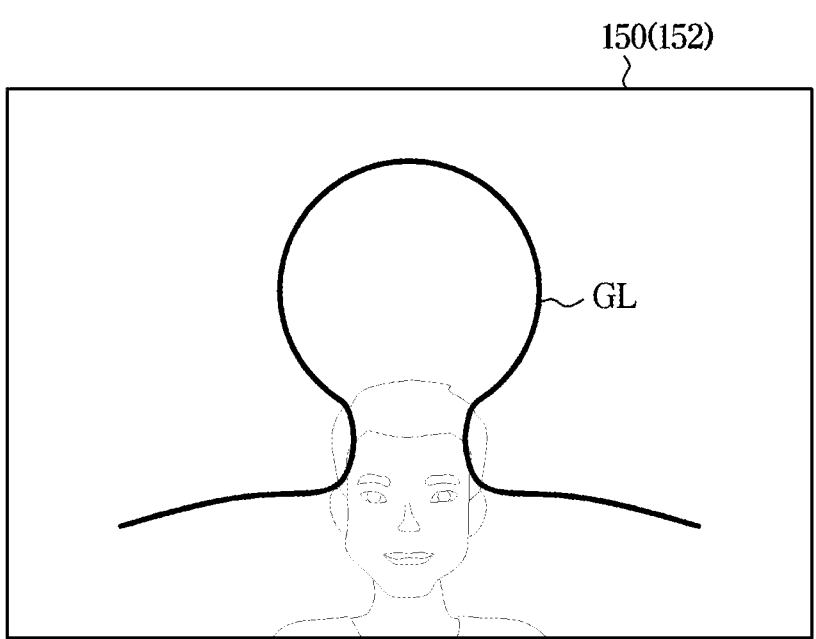
FIG. 5 is an exemplary diagram of a guideline displayed on at least one display provided in a vehicle.

FIG. 5 is an exemplary diagram of a guideline displayed on at least one display provided in a vehicle. FIG. 6 is a detailed configuration diagram of a processor shown in FIG. 4, and FIG. 7 is an exemplary diagram of communication and control of processors of a vehicle.

As shown in FIG. 4, the vehicle 1 includes an opening-closing member 116a, a locking member 117, an operation member 118a, an authentication camera 130, a first input unit 144a, a first display 144b, a terminal 150, a speaker 153, and an authentication device 160.

The opening-closing member 116a may be provided at each door 115 and connected to a window glass 116 provided at each door 115. That is, the opening-closing member 116a may be provided on each of the openable/closable window glasses.

The opening-closing member 116a may open or close the window glass 116 in response to a control command from the processor 161.

The opening-closing member 116a may open the window glass 116 at an opening degree corresponding to a control command from the processor 161.

The locking member 117 is provided on each door 115 to maintain each door 115 in an unlocked state to make it possible to open and close each door 115 or in a locked state to make it impossible to open and close each door 115.

The locking member 117 may lock the door 115 to the vehicle body or unlock the door 115 from the vehicle body in response to a control command from the processor 161.

The operation member 118a may be provided on the handle 118 of the door to transmit a lock signal corresponding to the user's door lock command and an unlock signal corresponding to the user's door unlock command to the processor 161.

The operation member 118a may be provided as a touch type to transmit a touch signal made by a user to the processor 161. For example, the operation member 118a may transmit to the processor 161 a touch signal corresponding to the user's intention to unlock the door and a touch signal corresponding to the user's intention to lock the door.

The authentication camera 130 may be woken up in response to the approach of the user and may be switched to the sleep mode in response to not sensing the user.

The authentication camera 130 may wake up in response to a user's face registration start command.

The authentication camera 130 may enter a sleep mode or a wakeup mode in response to a control command from the authentication device 160.

The authentication camera 130, as a device for acquiring an image, may include a CCD or CMOS image sensor and a camera using infrared rays.

The authentication camera 130 may be provided around the driver's seat side door to have an outward field of view from the vehicle to acquire an image of the outside of the vehicle.

The authentication camera 130 may be rotatably provided in the vehicle to change the field of view of the camera. The authentication camera 130 may rotate to face a direction corresponding to the location where the user is recognized.

The authentication camera 130 detects objects around the vehicle, converts object information into an electrical image signal, and transmits the image signal to the processor 161.

The first input unit 144a may receive a user's face registration start command.

The first display 144b may display operation information corresponding to the information received via the first input unit 144a. The first display 144b may display operation information on a function being performed in the vehicle. The first display 144b may display operation information of an electronic device provided in the vehicle.

The terminal 150 may be an audio-video-navigation (AVN) device.

The terminal 150 may include a second input unit 151 and a second display 152.

The second input unit 151 may receive a user input.

The second input unit 151 may receive a user input for at least one of an audio function, a video function, a navigation function, a broadcasting function (DMB function), a radio function, a content playback function, an Internet search function, and an autonomous driving information display function.

The second input unit 151 may receive user identification information, a face registration start command, a face registration end command, and a face deletion command.

The user identification information may include at least one of a user's name, a user's ID, and a user's phone number.

The second input unit 151 may be implemented with at least one of a physical button, a key, and a switch.

The second input unit 151 may be implemented with a jog dial or a touch pad for inputting a movement command of a cursor displayed on the terminal (AVN) 150 and a selection command.

The second input unit 151 may receive an operation command and operation information of at least one electronic device provided in the vehicle.

The second display 152 of the terminal displays operation information on a function being performed by the terminal 150.

For example, the second display 152 may display information related to a phone call, information about content output through the terminal 150, information related to music reproduction, and information related to external broadcast information.

The second display 152 may display at least one of an image of a rear camera, an image of a black box, and an image for autonomous driving.

The second display 152 may display guide information related to face registration, guidelines for face registration, guide information for a face registration procedure, guide information for face re-registration, and guide information for face registration completion.

The second display 152 may be provided as, but not limited to, a cathode ray tube (CRT), a digital light processing (DLP) panel, a plasma display panel (PDP), a liquid crystal display (LCD) panel, an electroluminescence (EL) panel, an electrophoretic display (EPD) panel, an electrochromic display (ECD) panel, a light emitting diode (LED) panel, or organic light emitting diode (OLED) panel. may be provided as a panel.

The speaker 153 may output guide information for face registration in sound or voice in response to a control command of the processor 161.

For example, the speaker 153 may output guide information for a face registration procedure, guide information for face re-registration, and guide information for face registration completion in sound or voice.

The speaker 153 may be one or two or more.

The authentication device 160 performs user authentication through face recognition.

The authentication device 160 may also perform user authentication through at least one of fingerprint recognition, voice recognition, vein recognition, and iris recognition, as well as the face recognition. In this case, at least one of a sensor for acquiring fingerprint information, a sensor for acquiring voice information, a sensor for acquiring vein information and a sensor for acquiring iris information may be provided on the exterior of the vehicle body.

In some implementations, user authentication through face recognition will be described.

The authentication device 160 may register user information capable of identifying a user, identifies whether a user detected in response to user detection is a registered user, and transmit, upon identifying the user as a registered user, authentication success information to at least one electronic device provided in the vehicle. The at least one electronic device may be an electronic control unit (ECU).

Upon successful authentication, the authentication device 160 may transmit to the locking member 117 a lock command for control of locking the door 115 or an unlock command for control of unlocking the door 115.

Upon successful authentication, the authentication device 160 may also transmit to the opening-closing member 116a an opening command for control of opening the window glass or a closing command for control of closing the window glass 116.

The authentication device 160 may wake up in response to the touch signal from the operation member 118a.

The authentication device 160 may also transmit a wakeup command to the authentication camera 130 in response to the touch signal from the operation member 118a.

The authentication device 160 includes a processor 161, a memory 162, and a communicator 163.

Upon receipt of a face registration start command through the second input unit 151 of the terminal, the processor 161 controls an operation for face registration.

The processor 161 controls to output guide information for the face registration procedure.

When controlling outputting guide information, the processor 161 may control the operation of the second display 152 of the terminal and the operation of the speaker 153.

For example, the processor 161 may control to output guide information for the user to look at the authentication camera 130 provided in the B pillar after getting off the vehicle.

The processor 161 transmits a wakeup command to the authentication camera 130 in response to receiving the user's face registration start command.

In order to prevent the guide information for the face registration procedure from being transmitted to the outside of the vehicle, the processor 161 may control to output the guide information for the face registration procedure in response to the user being in the boarding state.

In the case where the user is in the boarding state, the door 115 is in a closed state, and the window glass 116 is in a closed state, the processor 161 may control the outputting of guide information for the face registration procedure.

The processor 161 may control to open the window glass 116 upon determining that the user is in the alighting state. The processor 161 may transmit an opening command of the window glass 116 to the opening-closing member 116a.

Upon determining that the user is in the alighting state, the processor 161 may control to open the window glass 116 after a predetermined time elapses from the time the user gets off.

The processor 161 may determine whether the user is in the boarding state or the alighting state based on the detection information of the occupant detector provided on the seat.

Here, the occupant detector detects the user's boarding information of each seat in order to recognize the presence or absence of a user in the vehicle and the number of passengers, and outputs the detected user's boarding information.

The occupant detector may be provided on at least one of a seat and a seat belt of the vehicle.

For example, the occupant detector may include at least one of a weight detector, a pressure detector, a capacitance detector, and a seat belt fastening detector.

The occupant detector may include an internal camera provided inside the vehicle.

The processor 161 may check whether the coupling member of the door is in the coupled state or the separated state and determine whether the door is open or closed based on the check result.

The processor 161 may determine whether the window glass is in a closed state or an open state in response to the operating state of the opening-closing member 116a.

As shown in FIG. 5, the processor 161 may control the second display 152 of the terminal to display a guideline corresponding to an area in which the outline matches the face image of the user's face.

The processor 161 may control the second display 152 of the terminal to display the face image acquired by the authentication camera 130 in real time.

The processor 161 may determine whether the face image is normally acquired based on the outline information on the face image acquired by the authentication camera 130 and location information of the guideline.

In this case, the user may recognize whether the face image is normally acquired while looking at the second display 152 of the terminal from outside of the vehicle.

The processor 161 may control the speaker 153 to output guide information for acquiring a face image.

In the case where the guideline and the outline of the face image do not match, the processor 161 may control the speaker to additionally output guide information in sound or voice.

For example, additional guide information, which is output in the case where the guideline and the outline of the face image do not match, may include "Face is too close to the authentication camera.", "Face is too far away from the authentication camera.", "Please look at the camera.", etc.

Upon determining that the outline of the face image matches the guideline based on the outline information of the face image acquired by the authentication camera 130 and the location information of the guideline, the processor 161 may register and store the acquired face image as the face image of the user.

The processor 161 may store the face image together with the user's identification information.

The processor 161 may control the second display 152 to display face registration completion information.

Upon receipt of a face registration end command via the second input unit 151, the processor 161 may control the second display 152 to change the screen of the second display 152 to a default image.

In response to the user's face being recognized through the authentication camera 130, the processor 161 may perform user's face authentication on the recognized face, control the lock of the vehicle door 115 in response to the result of the face authentication, or transmit a lock command and a unlock command to the locking member 117.

It may also be possible for the processor 161 to transmit an opening command for control of opening the window glass 116 or a closing command controlling the closing command for control of closing the window glass 116 to the opening-closing member 116a in response to the user's face authentication result.

It may also be possible for the processor to wake up in response to a touch signal of the operation member 118a, transmit a wakeup command to the authentication camera 130, recognize a face based on image information acquired from the authentication camera 130, and perform user authentication on the recognized face.

The processor 161 may control, upon receipt of a face deletion command via the second input unit 151, to display the identification of the registered user, check the user's identification information received via the second input unit 151, and delete the identified face information and the identification information of the user.

The processor 161 performs overall control of the operations of the authentication device.

The processor 161 may be implemented with a memory storing an algorithm for controlling the operations of the components included in the vehicle and the authentication device or data for a program reproducing the algorithm and a processor performing the above-described operations using the data stored in the memory.

Face recognition of a user, user authentication, and operation control of the electronic device may be performed by one processor.

Figure 6:
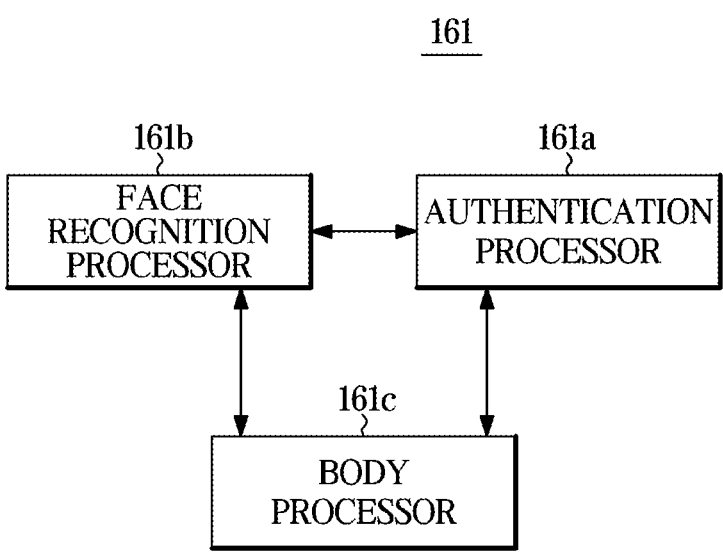
FIG. 6 is a detailed configuration diagram of an example of the processor shown in FIG. 4.

As shown in FIG. 6, the processor 161 may include an authentication processor 161a for user authentication, a face recognition processor 161b for recognizing a user's face, and a body processor 161c for controlling the operation of at least one electronic device provided in the vehicle in response to the user authentication result.

The authentication processor 161a and the face recognition processor 161b may be processors provided in the authentication device 160 and may communicate with the body processor 161c.

In this case, the authentication processor 161a, the face recognition processor 161b, and the body processor 161c may transmit and receive various types of information through controller area network (CAN) communication.

In addition, the authentication processor 161a, the face recognition processor 161b, and the body processor 161c for locking/unlocking the doors and opening/closing the window glasses may be processors provided in the authentication device 160.

The configurations of the authentication processor 161a, the face recognition processor 161b, and the body processor 161c will be described later with reference to FIG. 7.

The memory 162 stores face information on the face of the user and stores the identification information of the user. In the case where there is a plurality of users, the memory 162 may store identification information and face information per user.

In the case where user authentication is performed through fingerprint, voice, vein, or iris recognition, in addition to face recognition, via the authentication device, the memory 162 further stores user-specific fingerprint information, user-specific voice information, user-specific vein information, or user-specific iris information.

The memory 162 may be implemented with, but without being limited to, at least one of storage media including a non-volatile memory device such as cache, read only memory (ROM), programmable ROM (PROM), erasable programmable ROM (EPROM), electrically erasable programmable ROM (EEPROM), and flash memory, a volatile memory device such as random access memory (RAM), hard disk drive (HDD), or compact disc-ROM (CD-ROM).

The memory 162 may be a memory implemented as a chip separate from the processor described above with respect to the processor 161 or as a single chip integrated with the processor.

The communicator 163 may include one or more components that enable communication with an external device, for example, a short-range communication module, a wired communicator module, and a wireless communication module, in addition to the components inside the vehicle 1 and the components inside the authentication device 160.

The external device may be a user terminal and a remote controller.

The short-range communication module may include various short range communication modules that transmit and receive signals using a wireless network in close range, such as a Bluetooth module, an infrared communication module, a radio frequency identification (RFID) communication module, a wireless local access network (WLAN) communication module, a near-field communication (NFC) module, and a Zigbee communication module.

The wired communication modules may include various cable communication modules such as a universal serial bus (USB) module, a high definition multimedia interface (HDMI) module, a digital visual interface (DVI) module, a recommended standard 232 (RS-232) communication module, a power line communication module, or a plain old telephone service (POTS) module, as well as various wired communication modules such as a controller area network (CAN) module, a local area network (LAN) module, a wide area network (WAN) module, or a value-added network (VAN) module.

The wired communication module may further include a Local Interconnect Network (LIN).

The wireless communication module may include radio communication modules supporting various radio communication systems such as a global system for mobile communication (GSM), a code division multiple access (CDMA), wideband code division multiple access (WCDMA) module, a universal mobile telecommunications system (UMTS) module, a time division multiple access (TDMA) module, a long-term evolution (LTE) module, and an ultra-wideband (UWB) module.

The communicator 163 may be divided into different modules according to external devices that communicate with the vehicle.

The communicator 163 may include a plurality of communication modules that perform communication using different communication protocols.

Figure 7:
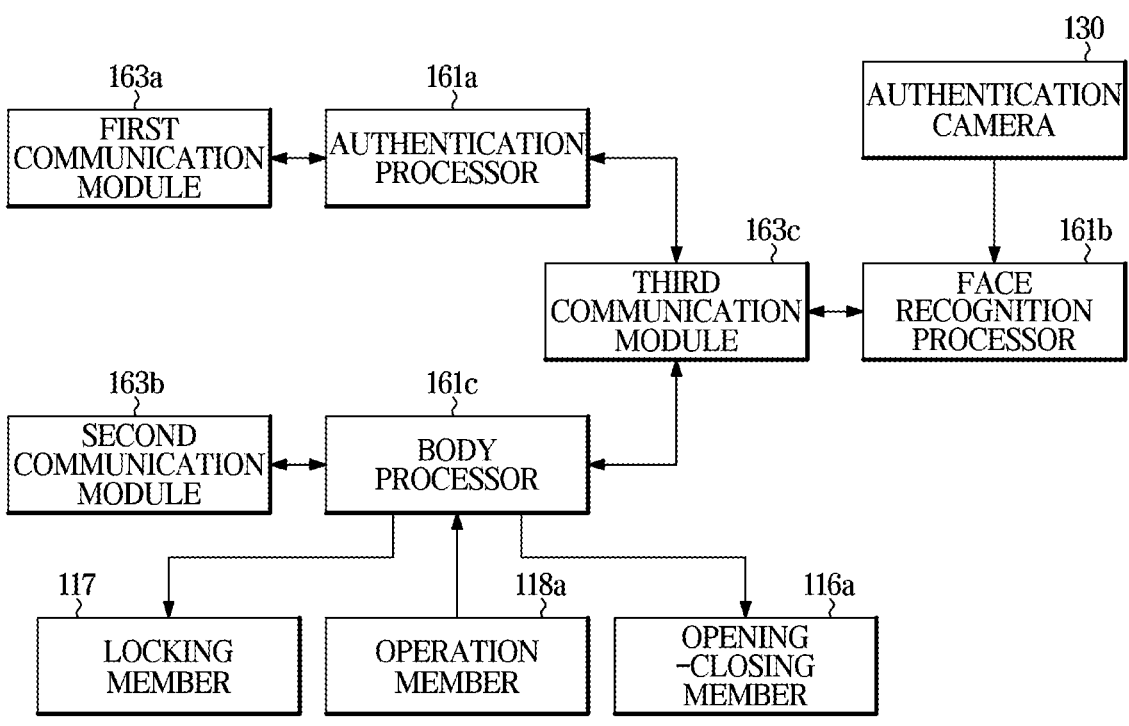
FIG. 7 is a diagram illustrating an example of communication and control of processors of a vehicle.

As shown in FIG. 7, the first communication module 163a may be a communication module for performing communication with a user terminal.

The first communication module 163a may be a communication module provided in the face recognition processor 161b or the authentication processor 161a.

The first communication module 163a may include one or more of a Bluetooth low energy (BLE) module, an ultra-wideband (UWB) module, and a near-field communication (NFC) module.

When receiving a signal from the user terminal, the first communication module 163a may receive information on the received signal strength together.

The second communication module 163b may be a communication module for performing communication with the remote controller. The second communication module 163b may include a plurality of antennas.

The second communication module 163b may acquire information on the received signal strength based on a signal received through at least one of the plurality of antennas.

The second communication module 163b may be a communication module provided in the body processor 161c.

The third communication module 163c may include a CAN communication module for communication between various devices provided in the vehicle.

The third communication module 163c may perform CAN communication or Ethernet communication with the authentication processor 161a and may perform CAN communication with the body processor 161c. Here, the CAN communication may be a body CAN (B CAN) communication.

As shown in FIG. 7, it is also possible for the authentication processor 161a to acquire information on the distance to the user terminal based on the received signal strength of the signal received through the first communication module 163a, determine whether the distance to the user terminal exceeds the first reference distance based on the acquired information on the distance to the user terminal and a predetermined reference distance information, and transmit, upon determining that the distance to the user terminal exceeds the first reference distance, a sleep command to the face recognition processor 161b and the authentication camera 130.

Upon determining that the distance to the user terminal is less than or equal to the first reference distance, the authentication processor 161a may transmit a wakeup command to the face recognition processor 161b and the authentication camera 130 as well and may transmit a face recognition command to the face recognition processor 161b.

The authentication processor 161a determines whether the user having the received face information is a pre-registered user based on the received face information and the face information stored in the memory 162, transmits, upon determining that the user having the received face information is a pre-registered user, information on the success of the user authentication to the body processor 161c, and transmit, upon determining that the user having the received face information is not a pre-registered user, information on the failure of user authentication.

It is also possible for the authentication processor 161a to communicate, upon receipt of information indicative of receipt of a touch signal from the body processor 161c, with the user terminal via the first communication module, perform user authentication based on an electronic key received from the user terminal, and control the unlocking operation of the locking member 117 to unlock the door.

The authentication processor 161a may acquire information on the distance to the user terminal based on the received signal strength received via the first communication module 163a after the lock control of the door 115 is completed and transmit, upon determining that the distance to the user terminal exceeds the first reference distance based on the acquired information on the distance to the user terminal and the reference distance information, a sleep command to the face recognition processor 161b and the authentication camera 130. Here, the face recognition processor 161b and the authentication camera 130 enter sleep mode in response to receiving a power-off command.

The authentication processor 161a may transmit a wakeup command to the face recognition processor 161b and the authentication camera 130 in response to the user's face registration start command and receive and store face information recognized by the face recognition processor 161b.

The authentication processor 161a may transmit a sleep command to the face recognition processor 161b and the authentication camera 130 in response to the user's face registration termination command.

The face recognition processor 161b may perform a wakeup mode in response to receipt of a wakeup command, a sleep mode in response to receipt of a power-off command, and a face recognition mode in response to a face recognition command.

The face recognition processor 161b performs a face recognition mode based on image information acquired via the authentication camera 130 in response to receipt of a face recognition command.

The face recognition processor 161b may transmit face information recognized while performing the face recognition mode to the authentication processor 161a.

That is, the face recognition processor 161b may recognize, after being completely waken up, a face based on the image information acquired via the authentication camera 130 and control to transmit face information on the recognized face to the authentication processor 161a and the body processor 161c through the third communication module 163c.

The face recognition processor 161b may control to display of guidelines in response to the user's face registration start command, check the outline information of the face image acquired by the authentication camera 130, and determine whether face information is acquired based on the outline information of the acquired face image and the location information of the guideline.

The face recognition processor 161b may determine, upon determining that the outline of the acquired face image and the guide line match based on the acquired outline information of the face image and the location information of the guide line, that the face information is normally recognized and, upon determining that the outline of the acquired face image and the guide line mismatch based on the acquired outline information of the face image and the location information of the guide line, that the face information is abnormally recognized.

Upon determining that the face information is normally recognized, the face recognition processor 161b registers the recognized face information as the user's face information.

It is also possible for the face recognition processor 161b to determine whether the user is in the boarding state or alighting state and control, upon determining that the user is in the boarding state, the terminal to output guide information for the face registration procedure.

It is also possible for the face recognition processor 161b to determine whether a predetermined time has elapsed from the time when the user gets off and transmit, upon determining that a predetermined time has elapsed, a window glass opening command to the body processor.

It may be possible for the face recognition processor 161b to request, upon receipt of a user's face registration start command, the user to input user's height and store, upon receipt of the height information from the terminal 150, the received height information of the user.

The body processor 161c may control the operation of the opening-closing member 116a in response to a user's face registration start command.

The body processor 161c may control the operation of the opening-closing member 116a in response to a user's face registration start command to open the driver's seat side window glass.

The body processor 161c determines whether a touch signal is received from the operation member 118a in response to the receipt of the user authentication success information and controls, upon determining that the touch signal is received from the operation member 118a, the unlocking operation of the locking member 117 to unlock the door.

It is also possible for the body processor 161c to control to output an alarm in response to receipt of user authentication failure information, determine whether a touch signal is received from the operation member 118a, and communicate, upon determining that a touch signal is received from the operation member 118a, with a remote controller, perform user authentication based on a remote key authentication signal received from the remote controller, and control the unlock operation of the locking member 117 to unlock the door.

The body processor 161c may determine whether the user got off based on the door opening/closing signal in the state where the engine is turned off, transmit, upon determining that the user got off, a face recognition command to the face recognition processor 161b in response to receipt of a touch signal from the operation member 118a, control, upon receipt of the user's authentication success information from the authentication processor 161a, the locking operation of the locking member to lock the door, and transmit information on the locking control of the door to the authentication processor 161a.

It is also possible for the body processor 161c to transmit a face recognition command to the face recognition processor 161b in response to receipt of a touch signal from the operation member 118a after the user gets off and control, upon receipt of user authentication failure information from the authentication processor 161a, the unlock operation of the locking member 117 to maintain the unlocking state of the door.

It is also possible for the body processor 161c to attempt, upon failure of the user authentication, a communication connection with at least one of the remote controller and the terminal and control, in response to communication connection with at least one of the remote controller and the terminal being possible, to unlock the door.

It is also possible for the body processor 161c to control, upon succeeding the user authentication, activating the start button and to deactivate, failing the user authentication, the start button.

The body processor 161c may transmit a wakeup command or a sleep command and a face recognition command to the face recognition processor 161b and the authentication camera 130 based on the received signal strength of the signal received via the second communication module 163b.

The body processor 161c acquires information on the distance to the remote controller based on the received signal strength of the signal received via the second communication module 163b, determines whether the distance to the remote controller exceeds the first reference distance based on the acquired distance information to the remote controller and predetermined reference distance information, and transmits, upon determining that the distance to the remote controller exceeds the first reference distance, a sleep command to the face recognition processor 161b and the authentication camera 130.

The body processor 161c transmits, upon determining that the distance to the remote controller is less than or equal to the first reference distance, a wakeup command to the face recognition processor 161b and the authentication camera 130.

Here, the face recognition processor 161b may perform the wakeup mode in response to receipt of a booting command, and the authentication camera 130 may also perform the wakeup mode in response to receipt of the wakeup command.

After the face recognition processor 161b is completely woken up, the body processor 161c acquires information on the distance to the remote controller based on the received signal strength of the signal received via the second communication module 163b, determine whether the distance to the remote controller exceeds a second reference distance based on the acquired distance information to the remote controller, and controls, upon determining that the distance to the remote controller exceeds the second reference distance, the face recognition processor 161b to remain in the wakeup mode, and transmit, upon determining that the distance to the remote controller is less than or equal to the second reference distance, a face recognition command to the face recognition processor 161b.

The body processor 161c may acquire, after the door lock control is completed, information on the distance to the remote controller based on the received signal strength received via the second communication module 163b and transmit, upon determining that the distance to the remote controller exceeds the first reference distance based on the acquired distance information to the remote controller and reference distance information, a sleep command to the face recognition processor 161b and the authentication camera 130.

For example, the first reference distance may be approximately 2.5 m, and the second reference distance may be approximately 1 m. Here, the first reference distance may be a distance communicable by the first and second communication modules.

At least one component may be added or deleted according to the performance of the components of the authentication device 160 and the vehicle 1 shown in FIG. 4. In addition, it will be easily understood by those skilled in the art that the mutual positions of the components may vary according to the performance or structure of the system.

Meanwhile, each component shown in FIG. 4 means software and/or hardware components such as a Field Programmable Gate Array (FPGA) and an Application Specific Integrated Circuit (ASIC).

Figure 8:
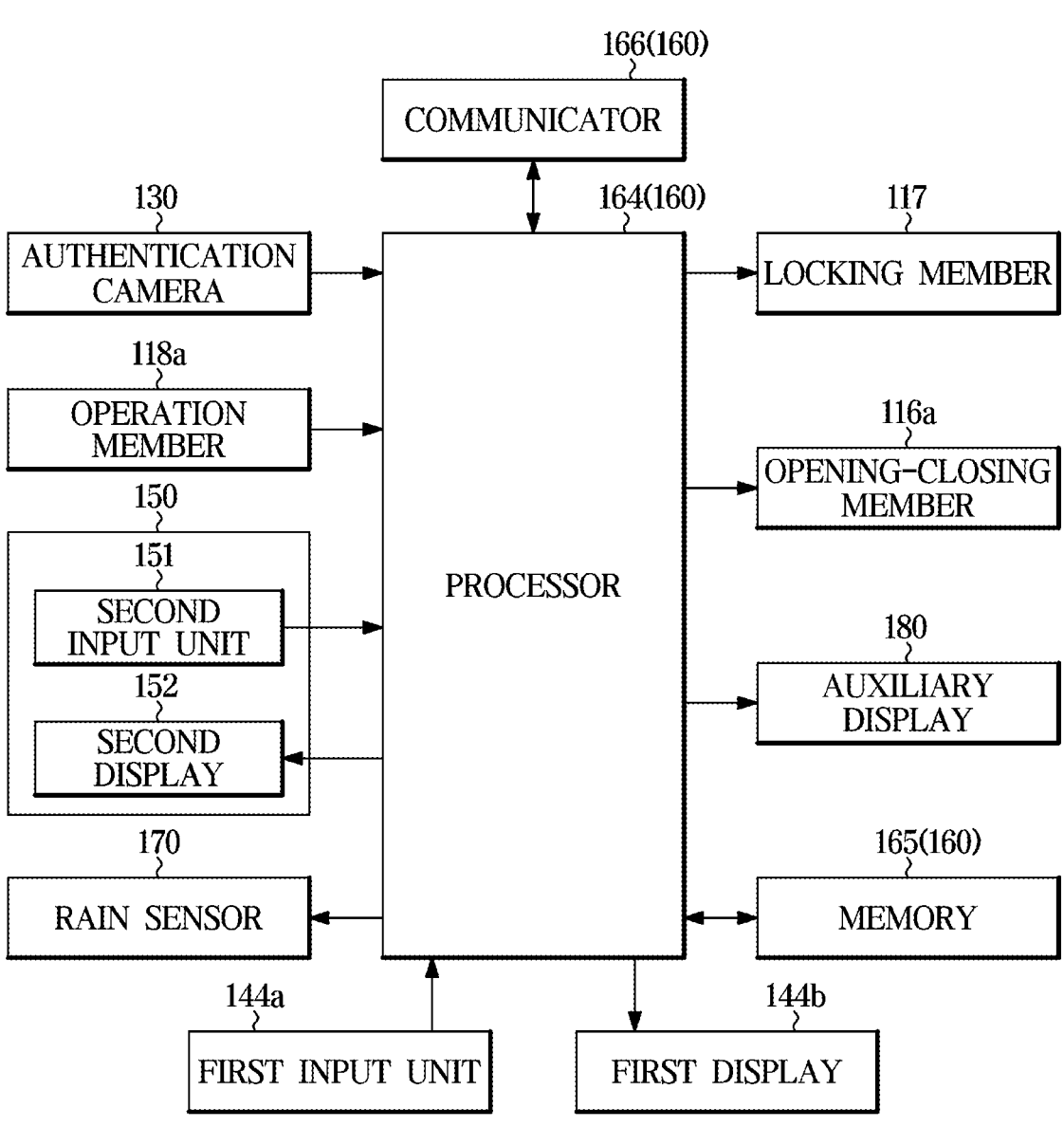
FIG. 8 is a control block diagram of an example of a vehicle.

FIG. 8 is a control block diagram of an example of a vehicle.

The vehicle 1 may include an opening-closing member 116*a*, a locking member 117, an operation member 118*a*, an authentication camera 130, a first input unit 144*a*, a first display 144*b*, a terminal 150, a speaker 153, an authentication device 160, a rain sensor 170, and an auxiliary display 180.

The opening-closing member 116*a*, the locking member 117, the operation member 118*a*, the authentication camera 130, the first input unit 144*a*, the first display 144*b*, and the speaker 153 are identical with the opening-closing member 116*a*, the locking member 117, the operation member 118*a*, the authentication camera 130, the first input unit 144*a*, the first display 144*b*, and the speaker 153, and thus descriptions thereof will be omitted.

The second input unit 151 of the terminal may receive user identification information, user's height information, weather information, and a face registration start command, a face registration end command, and face deletion command.

The second input unit 151 of the terminal may also receive the user's gender information.

The second display 152 of the terminal may display guide information for the user's height input request and weather input request.

Other configurations of the terminal are identical with those of the above-described implementations and thus descriptions thereof will be omitted.

The rain sensor 170 may detect the presence or absence of rain and transmit information about the detected presence or absence of rain to the processor 164.

It is also possible for the rain sensor 170 to detect the amount of rainfall and transmit information about the detected amount of rainfall to the processor 164.

The auxiliary display 180 may be a display other than the second display of the terminal.

For example, the auxiliary display 180 may be a monitor of a digital side mirror provided on the drivers seat side door or a monitor of a digital side mirror provided on the passengers seat side door.

The digital side mirror monitor provided on the passengers seat side door displays the image of the right rear view while the vehicle is driving and may display, when registering the user's face, the guideline and face image acquired by the authentication camera in real time.

The auxiliary display 180 may be a display provided in the rearview mirror. The display of the rearview mirror may display an image acquired by the rear camera and may display, when registering the user's face, a guideline and a face image acquired by the authentication camera in real time.

The authentication device 160 performs face recognition using the face image acquired via the authentication camera, and performs user authentication based on the recognized face information and pre-stored face information.

In addition to user authentication via face recognition, the authentication device 160 may also perform user authentication using at least one of fingerprint information, voice information, vein information, and iris information. In this case, at least one of a sensor for acquiring fingerprint information, a sensor for acquiring voice information, a sensor for acquiring vein information and a sensor for acquiring iris information may be provided on the exterior of the vehicle body.

In some implementations, user authentication through face recognition will be described.

The authentication device 160 may register user information capable of identifying a user, detecting user access, identifying whether the user is a registered user, and transmitting, upon identifying the user as a registered user, authentication success information to at least one electronic device provided in the vehicle. The at least one electronic device may be an electronic control unit (ECU).

It is also possible for the authentication device 160 to transmit to the locking member 117 a lock command for control of locking the door 115 or an unlock command for control of unlocking the door 115.

It is also possible for the authentication device 160 to transmit to the opening-closing member 116*a* an opening command for control of opening the window glass or a closing command for control of closing the window glass 116.

The authentication device 160 may wake up in response to a touch signal from the operation member 118*a*.

It is also possible for the authentication device 160 to transmit a wakeup command to the authentication camera 130 in response to a touch signal from the operation member 118*a*.

The authentication device 160 may include a processor 164, a memory 165, and a communicator 166.

Upon receipt of a face registration start command via the second input unit 151 of the terminal, the processor 164 controls an operation for face registration.

The processor 164 controls to output guide information for the face registration procedure.

When controlling outputting guide information, the processor 164 may control the operation of the second display 152 of the terminal and the operation of the speaker 153.

For example, the processor 164 may control to output guide information for the user to look at the authentication camera 130 provided in the B pillar after getting off the vehicle.

The processor 164 may control to output guide information requesting user's height input.

The processor 164 may control to output guide information requesting the user to input identification information.

The processor 164 may control to store the user's height information and the user's identification information received via the second input unit 151.

The processor 164 transmits a wakeup command to the authentication camera 130.

In order to prevent the guide information for the face registration procedure from being transmitted to the outside of the vehicle, the processor 164 may control to output the guide information for the face registration procedure in response to the user being in the boarding state.

In the case where the user is in the boarding state, the door 115 is in a closed state, and the window glass 116 is in a closed state, the processor 164 may control to output guide information for the face registration procedure.

The processor 164 may control to open the window glass 116 in response to the user being in the alighting state. The processor 161 may transmit an opening command of the window glass 116 to the opening-closing member 116*a*.

Upon determining that the user is in the alighting state, the processor 164 may control to open the window glass 116 after a predetermined time elapses from the time the user gets off.

The processor 164 determines, upon determining that the user is in the alighting state, whether the weather is rainy based on the detection information acquired by the rain sensor 170 and controls, upon determining that the weather is not rainy, the window glass to be opened at the first opening degree.

The processor 164 controls, upon determining that the user is in the alighting state and the weather is rainy, the operation of the opening-closing member to open the window glass at a second opening degree.

The first opening degree may be greater than the second opening degree.

For example, the first opening degree may be 100% to the fully open position of the window glass, and the second opening degree may be 30% to the fully open position of the window glass.

The processor 164 identifies, upon determining that the user is in the alighting state and the weather is rainy, the user's height information and resultantly the opening degree of the window glass that corresponds to the identified height information, and opens the window glass based on the identified window glass opening degree.

It is also possible for the processor 164 to determine, upon determining that the user is in the alighting state and the weather is rainy, whether the user's height information is stored in memory 165, identify, if it is determined that the user's height information is not stored in memory, an average adult height information stored in the memory 165 and resultantly a window glass opening degree corresponding to the identified average adult height information, and control the window glass to be opened based on the identified window glass opening degree.

It is also possible for the processor 164 to determine, upon determining that the user is in the alighting state and the weather is rainy, whether the user's height information is stored in memory 165 and identify, in response to the user's height being not stored in memory, the user's gender and resultantly the average height information corresponding to the identified gender (male or female) among average adult height information stored in the memory 165.

In this way, upon determining that the weather is not rainy during the face registration, it is possible to fully open the window glass of the driver's seat side door such that the user can directly see the guideline and the face image through the monitor of the side mirror provided on the passenger's seat side.

In addition, upon determining that the weather is rainy during face registration, it is possible to partially open the window glass of the driver's seat side door such that the user can directly see the guideline and the face image through the monitor of the side mirror provided on the passenger's seat side while minimizing the inflow of the rainwater into the vehicle.

It is also possible for the processor 164 to perform face recognition based on the image information acquired via the authentication camera 130 and identify the gender of the user based on the recognized face information.

It is also possible for the processor 164 to control the second display 152 to display guide information requesting the user's gender input and store the gender information received via the second input unit 151.

The processor 164 may determine whether or not the user is inside the vehicle based on the detection information of the occupant detector provided on the seat. The configuration thereof is the same as that of an implementation, and thus a description thereof will be omitted.

The processor 164 may check whether the coupling member of the door is in the coupled state or the separated state and determine whether the door is open or closed based on the check result.

The processor 164 may determine whether the window glass is in a closed state or an open state in response to the operating state of the opening-closing member 116*a*. It is also possible for the processor 164 to suspend, upon determining that the driver's seat side window glass 116 is in an open state, opening control of the window glass 116 in response to face registration.

The processor 164 may control the auxiliary display 180 to display a guideline corresponding to an area in which the face image of the user's face is matched.

The processor 164 may control the auxiliary display 180 to display the face image acquired by the authentication camera 130 in real time.

The processor 164 may determine whether the face image is normally acquired based on the outline information of the face image acquired by the authentication camera 130 and location information of the guideline.

In this case, the user may recognize whether the face image is normally acquired while looking at the auxiliary display 180 from the outside of the vehicle.

Here, the auxiliary display 180 may be at least one of a digital side mirror monitor and a rearview mirror display.

The digital side mirror monitor may be a digital side mirror monitor provided on the door on the passenger's seat side.

The processor 164 may control the speaker 153 to output guide information for face image acquisition.

In response to the guideline and the outline of the face image mismatching, the processor 164 may control the speaker to additionally output guide information in sound or voice.

Upon determining that the outline of the face image matches the guideline based on the outline information of the face image acquired by the authentication camera 130 and the location information of the guideline, the processor 164 may register and store the acquired face image as the face image of the user.

The processor 164 may store the face image together with the user's identification information.

The processor 164 may control the second display 152 to display face registration completion information.

Upon receipt of a face registration end command via the second input unit 151, the processor 164 may control the second display 152 to change the screen of the second display 152 to a default image.

In response to the user's face being recognized through the authentication camera 130, the processor 164 may perform user's face authentication on the recognized face, control the lock of the vehicle door 115 in response to the result of the face authentication, or transmit a lock command and a unlock command to the locking member 117.

A configuration for controlling at least one electronic device provided in a vehicle in response to user authentication is the same as that of the above-described implementation and thus a description thereof will be omitted.

The processor 164 may include an authentication processor, a face recognition processor, and a body processor, as in an implementation. In this case, the operation control related to face registration may be performed by the face recognition processor. The face recognition processor may transmit face information of the registered user to the authentication processor.

The processor 164 performs overall control of the operations of the authentication device.

The processor 164 may be implemented with a memory storing an algorithm for controlling the operations of the components included in the vehicle and the authentication device or data for a program reproducing the algorithm and a processor performing the above-described operations using the data stored in the memory.

The memory 165 stores face information on the face of the user and stores the identification information of the user. In the case where there are a plurality of users, the memory 165 may store identification information and face information per user.

In the case where user authentication is performed through fingerprint, voice, vein, or iris recognition, in addition to face recognition, via the authentication device, the memory 165 further stores user-specific fingerprint information, user-specific voice information, user-specific vein information, or user-specific iris information.

The memory 165 may store the identification information and height information of the user.

It is also possible for the memory 165 to store average adult height information and per-gender average adult height information.

The memory 165 may be implemented with, but without being limited to, at least one of storage media including a non-volatile memory device such as cache, read only memory (ROM), programmable ROM (PROM), erasable programmable ROM (EPROM), electrically erasable programmable ROM (EEPROM), and flash memory, a volatile memory device such as random access memory (RAM), hard disk drive (HDD), or compact disc-ROM (CD-ROM).

The memory 165 may be a memory implemented as a chip separate from the processor described above with respect to the processor 164 or as a single chip integrated with the processor.

The communicator 166 may include one or more components that enable communication with an external device, for example, a short-range communication module, a wired communicator module, and a wireless communication module, in addition to the components inside the vehicle and the components inside the authentication device 160.

The external device may be a user terminal and a server.

The communicator 166 may receive weather information from the server and transmit the received weather information to the processor 164.

Specific examples of the communicator 166 are the same as those of the communicator 163 and thus descriptions thereof will be omitted.

At least one component may be added or deleted according to the performance of the components of the authentication device 160 and the vehicle 1 shown in FIG. 8. In addition, it will be easily understood by those skilled in the art that the mutual positions of the components may vary according to the performance or structure of the system.

Meanwhile, each component shown in FIG. 8 means software and/or hardware components such as a Field Programmable Gate Array (FPGA) and an Application Specific Integrated Circuit (ASIC).

Figure 9:
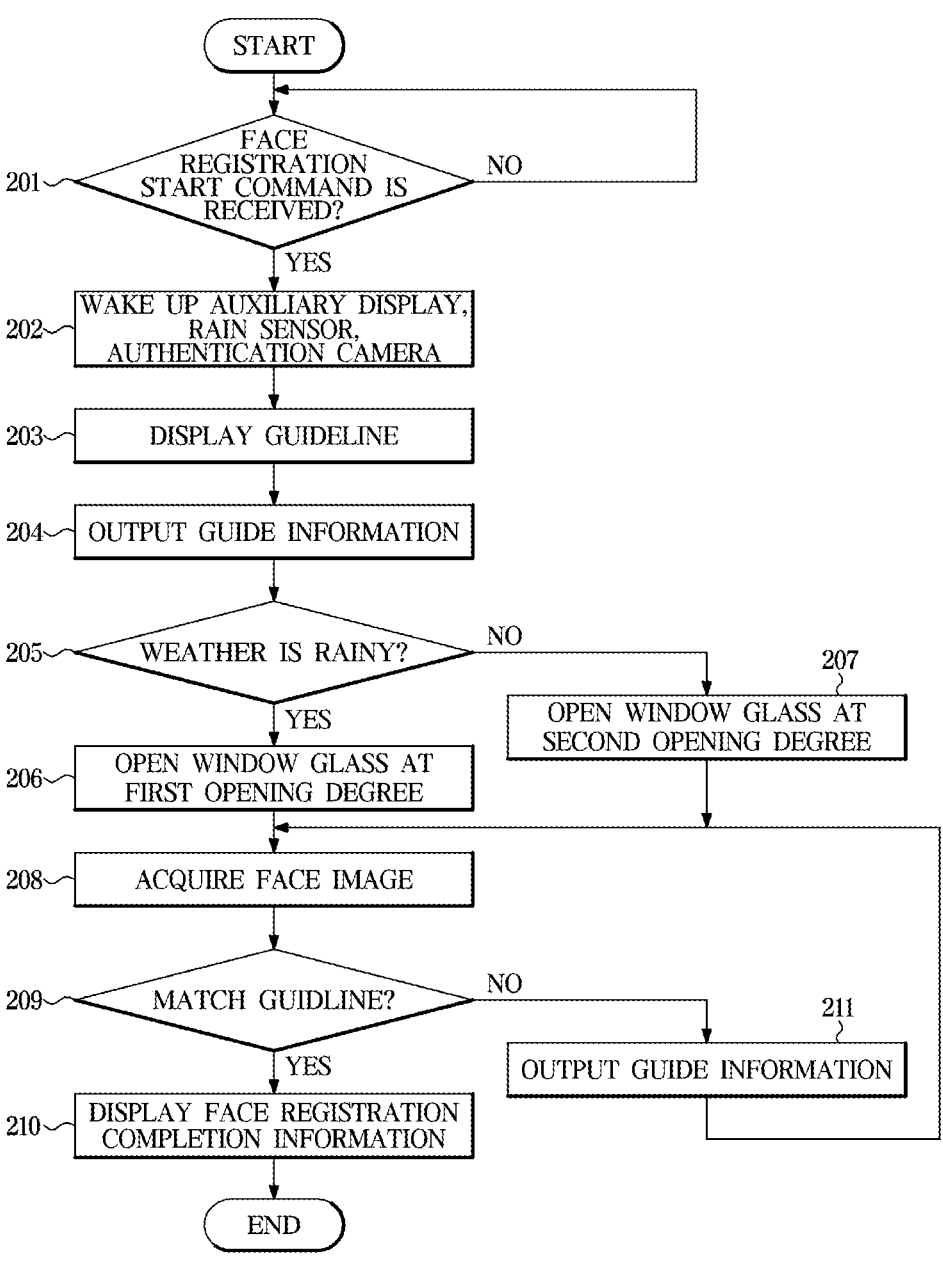
FIG. 9 is a flowchart illustrating an example of control of a vehicle.

FIG. 9 is a flowchart illustrating an example of control of a vehicle.

Upon receipt of a face registration start command at step 201 via the second input unit 151 of the terminal, the vehicle may wake up the auxiliary display 180, the rain sensor 170, and the authentication camera 130 at step 202.

The vehicle displays the guideline on the auxiliary display 180 at step 203. Here, the guideline may be a line in which the user's face image should be located.

The vehicle displays guide information on the face registration procedure on the second display 152 of the terminal (204), and outputs guide information for the face registration procedure through the speaker 153 in sound or voice.

For example, the vehicle may control to output guide information to guide the user to look at the authentication camera 130 provided in the non-pillar after getting off the vehicle.

The vehicle may display guide information requesting user's height input on the second display 152 and output the information in voice through the speaker 153.

The vehicle may output guide information for requesting input of identification information of the user, and guide information for requesting input of weather information.

In order to prevent the guide information for the face registration procedure from being transmitted to the outside of the vehicle, the vehicle may output guide information for the face registration procedure through at least one of the second display and the speaker upon determining that the user is in the boarding state.

Upon determining that the user is in the boarding state, the door is in the closed state, and the window glass is in the closed state, the vehicle may output guide information for the face registration procedure through at least one of the second display and the speaker.

The vehicle may control storing the user's height information and the user's identification information received via the second input unit 151.

The vehicle may determine whether the user is in the alighting state, count, upon determining that the user is in the alighting state, the time from the time the user got off, determine whether the counted time has passed a predetermined time, and open, upon determining that the counted time has passed the predetermined time, the window glass 116 provided on the driver's seat side door.

It is possible to determine whether the user is in the alighting state based on the detection information of the occupant detector provided on the seat.

It is possible to determine that the user is in the alighting state in such a way as to check whether a coupling member of the door is in a coupled state or a separate state and determine, upon determining that the door is in a closed state after being opened in response to the check result, determine that the user is in the alighting state.

The vehicle may control, when opening the window glass provided in the driver's seat side door, the opening degree of the window glass based on weather information.

In more detail, the vehicle determines at step 205 whether the weather is rainy based on the detection information detected by the rain sensor 170.

The vehicle may also determine whether the weather is rainy based on the weather information received via the second input unit 151.

The vehicle may also determine whether the weather is rainy based on the weather information received via the communicator 166.

Upon determining that the weather is not rainy, the vehicle opens the window glass at the first open degree at step 206.

Before opening the window glass 116 on the driver's seat side door at the first opening degree, the vehicle may determine whether the window glass 116 on the driver's seat side door is in the opened state, identify, upon determining that the window glass is open, the opening degree of the window glass 116, and open, in response to the identified opening degree being less than the first opening degree, the window glass up to the first opening degree.

Upon determining that the identified opening degree is equal to the first opening degree, the vehicle may maintain the open state of the window glass.

Upon determining that the weather is rainy, the vehicle may determine whether the user's height information is stored in the memory 165, identify, upon determining that the user's height information is stored in the memory, the second opening degree of the window glass that corresponds to the user's height information, and open, at step 207, the window glass provided in the driver's seat side door based on the identified second opening degree of the window glass.

The second opening degree may be less than the first opening degree. For example, the first opening degree may be 100% of the opening degree corresponding to the full open state of the window glass, and the second opening degree may be less than 100% of the opening degree corresponding to the full open state of the window glass.

Here, the second opening degree may change according to the height of the user.

It is also possible for the vehicle to identify, upon determining that the user's height information is not stored in the memory 165, the average adult height information stored in the memory 165 and resultantly the second opening degree of the window glass that corresponds to the identified average adult height information, and open the window glass based on the identified second opening degree of the window glass.

In addition, it is also possible for the vehicle to identify, upon determining that the user's height information is not stored in the memory 165, the gender of the user, average adult height information corresponding to the identified gender (male or female) among the average adult height information stored in the memory, and resultantly the second opening degree corresponding to the identified average adult height information.

It is also possible for the vehicle to perform face recognition based on the image information acquired via the authentication camera 130 and identify the user's gender based on the recognized face information and based on the user's gender information stored in the memory.

Before opening the window glass 116 provided in the driver's seat door to the second open degree, the vehicle may determine whether the window glass 116 provided in the driver's seat door is in an open state, identify, upon determining that the window glass is in an open state, the opening degree of the window glass 116, and open, in response to the identified opening degree being less than the second opening degree, the window glass up to the second opening degree.

It is also possible for the vehicle to maintain, in response to the checked opening degree being equal to or greater than the second opening degree, the open state of the window glass or open the window glass to the second opening degree.

The vehicle acquires, at step 208, face information of the user's face via the authentication camera 130 and displays a face image on the auxiliary display 180 in real time based on the acquired face information.

The vehicle may display the guideline and the face image in real-time on the auxiliary display 180.

The vehicle may acquire outline information of the face image based on the face information and determine whether the face image is located inside the guideline based on the acquired outline information of the face image and location information of the guideline.

That is, the vehicle may determine whether the face image acquired via the authentication camera 130 is normally acquired by determining at step 209 whether the outline of the face image match the guideline.

Here, the user may recognize whether the face image is normally acquired while looking at the auxiliary display 180 from the outside of the vehicle.

Here, the auxiliary display 180 may be at least one of a digital side mirror monitor and a rearview mirror display. The digital side mirror monitor may be a digital side mirror monitor provided on the door on the passenger's seat side.

Upon determining that the outline of the face image matches the guideline, the vehicle may register and store the acquired face image as a face image of the user.

The vehicle may store the face image together with the identification information of the user.

The vehicle may display face registration completion information on the second display 152 of the terminal at step 210.

Upon receipt of a face registration end command via the second input unit 151 of the terminal, the vehicle may change the screen of the second display 152 to a default image.

Upon determining that the guideline and the outline of the acquired face image do not match, the vehicle may output guide information for face registration at step 211.

The vehicle may guide the user to change the user's location, the user's gaze, and the like for acquiring the face image.

The vehicle may output guide information requesting matching of the guideline and the face image displayed on the auxiliary display 180 through at least one of the second display and the speaker.

Upon determining that the weather is rainy during face registration, it is possible to partially open the window glass of the driver's seat side door such that the user can directly see the guideline and the face image through the monitor of the side mirror provided on the passengers seat side while minimizing the inflow of the rainwater into the vehicle.

In this way, the vehicle may display a guideline on the auxiliary display to help accurately register the face of the user.

The present disclosure is capable of improving the accuracy and convenience of face registration and giving users a sense of security, when registering the face of a user, in such a way as to display a guideline and face image in real time on at least one of a plurality of displays installed in the vehicle (e.g., digital side mirror monitor, AVN device, and rearview mirror).

That is, the present disclosure allows the user to check and recognize intuitively that the face image of the user is correctly registered. The present disclosure allows the user to experience the luxury of the vehicle through the visual effect.

The present disclosure makes it possible to acquire a face image with least deformation in such a way as to guide the user to position the face inside a guideline rather than an abstract position. The present disclosure is capable of reinforcing security by improving recognition accuracy of a face image with respect to use of a vehicle after registration of a face image.

The present disclosure is capable of being implemented through software modification without change in hardware, thereby preventing a certain cost from being incurred by adding and manufacturing hardware.

The present disclosure is capable of improving the quality and marketability of the vehicle by reinforcing security and, as well, improving the safety of the vehicle and securing product competitiveness.

Meanwhile, the disclosed implementations may be implemented in the form of a recording medium storing instructions executable by a computer. The instruction may be stored in the form of a program code, and when executed by a processor, a program module may be generated to perform operations of the disclosed implementations. The recording medium may be implemented as a computer-readable recording medium.

The computer-readable recording medium includes any type of recording medium in which instructions readable by the computer are stored. For example, there may be a read only memory (ROM), a random access memory (RAM), a magnetic tape, a magnetic disk, a flash memory, an optical data storage device, and the like.

What is claimed is:

1. An authentication device comprising:
a communicator configured to communicate with an authentication camera, a vehicle terminal, and a rain sensor;
a body processor configured to control opening and closing of a window glass;
a face recognition processor configured to:
control, based on receipt of a face registration start command via the vehicle terminal, the vehicle terminal to display guide information for a face registration procedure and a guideline;
acquire outline information of a face image based on image information acquired via the authentication camera;
recognize face information based on (i) the acquired outline information of the face image and (ii) location information of the guideline;
register the recognized face information as face information of a user; and
transmit, to the body processor, an opening command to control, based on sensing information from the rain sensor indicating that weather is rainy, the window glass to be open at an opening degree that corresponds to height information of the user; and
an authentication processor configured to:
perform user authentication based on the face information recognized by the face recognition processor and preregistered face information of the user.

2. The device of claim 1, wherein the face recognition processor is further configured to:
determine whether the guideline and the outline of the face match based on the location information of the guideline and the outline information of the face image, and
register, based on a determination that the guideline and the outline of the face match, the recognized face information as the face information of the user.

3. The device of claim 1,
wherein the face recognition processor is further configured to:

determine whether the user is in a boarding state or an alighting state based on opening-closing control information of a door of the vehicle from the body processor, and
control, based on a determination that the user is in the boarding state, the vehicle terminal to output a guide information for the face registration procedure.

4. The device of claim 3, wherein the face recognition processor is further configured to:
determine, based on a determination that the user is in the alighting state, whether a predetermined time has elapsed from a time point when the user leaves the vehicle, and
transmit, based on a determination that the predetermined time has elapsed from the time point, an opening command of the window glass to the body processor.

5. The device of claim 1, wherein the opening degree that corresponds to the height information of the user is a second opening degree, and
wherein the face recognition processor is further configured to:
transmit, based on a determination that the weather is not rainy, a first opening command of a first opening degree of the window glass to the body processor, the first opening degree being greater than the second opening degree.

6. The device of claim 5, wherein the face recognition processor is further configured to:
determine whether the user is in an alighting state based on opening-closing control information of a door of the vehicle from the body processor,
determine, based on a determination that the user is in the alighting state, whether a predetermined time has elapsed from a time point when the user leaves the vehicle, and
transmit, based on a determination that the predetermined time has elapsed from the time point, the first opening command or the second opening command to the body processor.

7. The device of claim 5, wherein the face recognition processor is further configured to:
identify, based on a determination that the weather is rainy, the height information of the user,
identify the second opening degree corresponding to the identified height information of the user, and
transmit, to the body processor, the second opening command corresponding to the identified second opening degree.

8. The device of claim 5, wherein the face recognition processor is further configured to:
request, based on the receipt of the face registration start command, height of the user to the vehicle terminal, and
store, based on receipt of height information of the user from the vehicle terminal, the received height information of the user.

9. The device of claim 5, wherein the second opening degree is an opening degree corresponding to average adult height information.

10. An authentication device comprising:
a communicator configured to communicate with an authentication camera, a vehicle terminal, an auxiliary display, and a rain sensor;
a body processor configured to control opening and closing of a window glass;

a face recognition processor configured to:

control, based on receipt of a face registration start command through the vehicle terminal, the auxiliary display to display (i) a guideline indicating a designated area for positioning a face image of a user and (ii) a real-time face image of the user acquired by the authentication camera;

acquire outline information of a face image based on image information acquired via the authentication camera, recognize face information based on (i) the acquired outline information of the face image and (ii) location information of the guideline, register the recognized face information as face information of a user; and transmit, to the body processor, an opening command to control, based on sensing information from the rain sensor indicating that weather is rainy, the window glass to be open at an opening degree that corresponds to height information of the user; and an authentication processor configured to:

perform user authentication based on the face information recognized by the face recognition processor and preregistered face information of the user.

11. The device of claim 10, wherein the face recognition processor is further configured to:

determine whether the user is in a boarding state or an alighting state based on opening-closing control information of a door of the vehicle from the body processor, control, based on a determination that the user is in the boarding state, the vehicle terminal to output guide information for a face registration procedure, determine, based on a determination that the user is in the alighting state, whether a predetermined time has elapsed from a time point when the user leaves the vehicle, and transmit, based on a determination that the predetermined time has elapsed, an opening command of the window glass to the body processor.

12. The device of claim 10, wherein the opening degree that corresponds to height information of the user is a second opening degree, and wherein the face recognition processor is further configured to:

transmit, based on a determination that the weather is not rainy, a first opening command of a first opening degree of the window glass to the body processor.

13. The device of claim 12, wherein the second opening degree is less than the first opening degree.

14. The device of claim 10, wherein the face recognition processor is further configured to:

determine whether the guideline and an outline of a face of the user match based on the location information of the guideline and the outline information of the face image, and register, based on a determination that the guideline and the outline of the face match, the recognized face information as the face information of the user.

15. A vehicle comprising:

an authentication camera provided at an exterior of a body of the vehicle and configured to acquire image information;

a vehicle terminal provided at an interior of the body and configured to receive a user input and display information;

an auxiliary display provided at the interior of the body and configured to display an image;

a rain sensor configured to sense rain;

an opening-closing member configured to open and close of a window glass; and a processor configured to:

control, based on receipt of a face registration start command via the vehicle terminal, the vehicle terminal to display guide information for a face registration procedure, control the auxiliary display to display (i) a guideline indicating a designated area for positioning a face image of a user and (ii) a real-time face image of the user acquired by the authentication camera, acquire outline information of a face image based on the acquired image information, recognize face information based on (i) the acquired outline information of the face image and (ii) location information of the guideline, register the recognized face information as face information of a user of the vehicle, and control, based on sensing information from the rain sensor indicating that weather is rainy, the opening-closing member to open the window glass at an opening degree that corresponds to height information of the user.

16. The vehicle of claim 15, wherein the processor is further configured to:

determine whether the user is in a boarding state or an alighting state based on opening-closing information of a door, determine, based on a determination that the user is in the alighting state, whether a predetermined time has elapsed from a time point when the user leaves vehicle, and control, based on a determination that the predetermined time has elapsed from the time point, the opening-closing member to open the window glass.

17. The vehicle of claim 16, wherein the authentication camera is provided at a pillar of the body, and the window glass is provided at a driver side door among a plurality of doors of the vehicle.

18. The vehicle of claim 15, wherein the opening degree that corresponds to height information of the user is a second opening degree, and wherein the processor is further configured to:

control, based on a determination that the weather is not rainy, the window glass to be open at a first opening degree, the first opening degree being greater than the second opening degree.

19. The vehicle of claim 15, wherein the auxiliary display comprises at least one of (i) a side mirror monitor provided at an interior of a passenger side door or (ii) a display provided at a rearview mirror and configured to display center rearview image information acquired by a rear camera implemented at the vehicle.

20. The vehicle of claim 15, wherein the processor is further configured to determine whether the guideline and an outline of a face match based on the location information of the guideline and the outline information of the face image, and register, based on a determination that the guideline and the outline of the face match, the recognized face information as the face information of the user.

* * * * *